(12) United States Patent
Masuko

(10) Patent No.: US 9,053,077 B2
(45) Date of Patent: Jun. 9, 2015

(54) MACHINE TRANSLATION OF A WEB PAGE HAVING AN IMAGE CONTAINING CHARACTERS

(75) Inventor: Soh Masuko, Tokyo (JP)

(73) Assignee: Rakuten, Inc., Tokyo (JP)

( * ) Notice: Subject to any disclaimer, the term of this patent is extended or adjusted under 35 U.S.C. 154(b) by 397 days.

(21) Appl. No.: 13/806,594

(22) PCT Filed: Jun. 25, 2010

(86) PCT No.: PCT/JP2010/060882
§ 371 (c)(1),
(2), (4) Date: Jan. 31, 2013

(87) PCT Pub. No.: WO2011/161825
PCT Pub. Date: Dec. 29, 2011

(65) Prior Publication Data
US 2013/0132825 A1 May 23, 2013

(51) Int. Cl.
*G06F 17/21* (2006.01)
*G06F 17/28* (2006.01)

(52) U.S. Cl.
CPC ............ *G06F 17/218* (2013.01); *G06F 17/211* (2013.01); *G06F 17/289* (2013.01)

(58) Field of Classification Search
CPC .................................................... G06F 17/289
See application file for complete search history.

(56) References Cited

U.S. PATENT DOCUMENTS

2005/0197826 A1* 9/2005 Neeman .............................. 704/2
2012/0005571 A1* 1/2012 Tang et al. ..................... 715/234

FOREIGN PATENT DOCUMENTS

| JP | 2003-122751 A | 4/2003 |
| JP | 2003-157272 A | 5/2003 |
| JP | 2007-026398 A | 2/2007 |
| JP | 2010-157065 A | 7/2010 |
| JP | 2010-157066 A | 7/2010 |
| TW | 200933393 A | 8/2009 |

OTHER PUBLICATIONS

Office Action, TW Patent Application No. 100122290, date of Dispatch: Feb. 29, 2012.
English Translation of International Preliminary Report on Patentability mailed Jan. 24, 2013 in PCT Application No. PCT/JP2010/060882.

* cited by examiner

*Primary Examiner* — Scott Baderman
*Assistant Examiner* — Asher Kells
(74) *Attorney, Agent, or Firm* — Sughrue Mion, PLLC

(57) ABSTRACT

HTML data that contains at least a set of reference data (URL) of a visualized image containing characters, reference data (URL) of an un-visualized background image containing no characters whose display position is set to an area superimposed on the image, and un-visualized text data whose display position is set to an area superimposed on the background image data is stored in a web DB, and the un-visualized background image data and the text data are visualized and the visualized image data is un-visualized in a translation process.

8 Claims, 23 Drawing Sheets

*Fig.3*
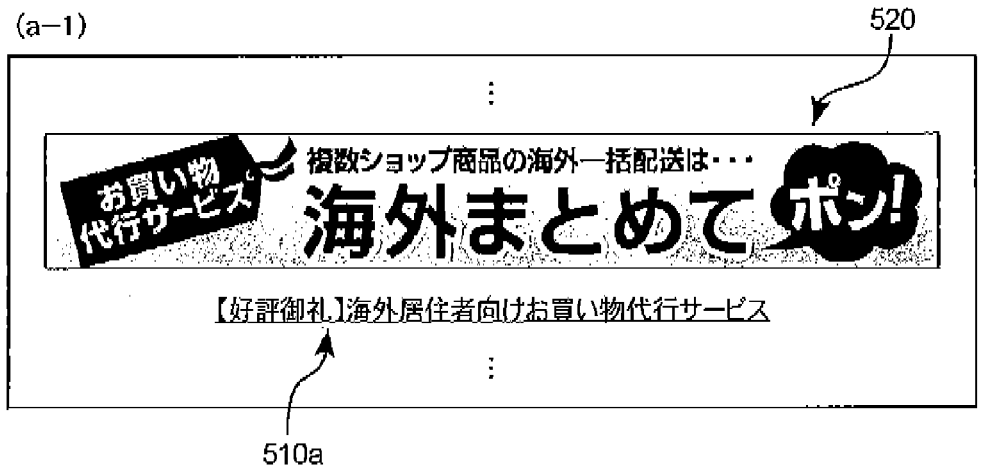
An easy option for overseas customers to shop at ●●●●
Multi-Product Shipping Services
[reliable and affordable] official purchasing agency services for overseas customers

```
⋮
<style type="text/css"><!--
    div.class_11 { color:transparent !important }
    img.class_21 { visibility:visible !important }
    img.class_22 { visibility:hidden !important }
--></style>
⋮
<div style="position:relative; width:840px; height:120px; font-size:125%">
    <div style="position:absolute; top:0px; left:0px; width:840px; height:120px">
        <img class="class_21" src="images/image01.gif" alt="海外まとめてポン" />
    </div>
    <div style="position:absolute; top:0px; left:0px; width:840px; height:120px">
        <img class="class_22" src="images/image02.gif" alt="" />
    </div>
    <div class="class_11" style="position:absolute; top:90px">
        ●●のショップでお買物をするお客様のための簡易なオプション<br />
        海外まとめてポン
    </div>
</div>

<div>
    <a href="proxy/index.html">
    【好評御礼】海外居住者向けお買い物代行サービス
    </a>
</div>
⋮
```

- 925a → `<div style="position:absolute; top:0px; left:0px; width:840px; height:120px">`
- 955a → `<div style="position:absolute; top:0px; left:0px; width:840px; height:120px">`
- 935a → `<div class="class_11" style="position:absolute; top:90px">`
- 915a → `<a href="proxy/index.html">`

(b)

```
⋮
<style type="text/css"><!--
    div.class_11 { color:transparent !important }
    img.class_21 { visibility:visible !important }
    img.class_22 { visibility:hidden !important }
--></style>

<base href="http://event.*******.co.jp/borderless/index.html" />
⋮
<div style="position:relative; width:840px; height:120px; font-size:125%">
    <div style="position:absolute; top:0px; left:0px; width:840px; height:120px">
        <img class="class_22" src="images/image01.gif" alt="海外まとめてポン" />
    </div>
    <div style="position:absolute; top:0px; left:0px; width:840px; height:120px">
        <img class="class_21" src="images/image02.gif" alt="" />
    </div>
    <div style="position:absolute; top:90px">
        An easy option for overseas customers to shop at ****<br />
        Multi-Product Shipping Services
    </div>
</div>

<div style="font-size:90%">
    <a href="proxy/index.html">
    [reliable and affordable] official purchasing agency services for overseas customers
    </a>
</div>
⋮
```

- 945b → `<base href="http://event.*******.co.jp/borderless/index.html" />`
- 925b → `<div style="position:absolute; top:0px; left:0px; width:840px; height:120px">`
- 955b → `<div style="position:absolute; top:0px; left:0px; width:840px; height:120px">`
- 935b → `<div style="position:absolute; top:90px">`
- 915b → `<a href="proxy/index.html">`

```
<div style="position:relative; width:840px; height:120px; font-size:125%">
    <div style="position:absolute; top:0px; left:0px; width:840px; height:120px">
        <img src="images/image01_bg.gif" alt="海外まとめてポン" />
    </div>
    <div style="position:absolute; top:30px">
        ●●のショップでお買物をするお客様のための簡易なオプション<br />
        海外まとめてポン
    </div>
</div>

<div>
    <a href="proxy/index.html">
        [好評御礼]海外居住者向けお買い物代行サービス
    </a>
</div>
```

720 → `<div style="position:absolute; top:0px; left:0px; width:840px; height:120px">`
730a → `●●のショップでお買物をするお客様のための簡易なオプション<br />`
710a → `<a href="proxy/index.html">`

(b)

```
<base href="http://event.*******.co.jp/borderless/index.html" />

<div style="position:relative; width:840px; height:120px; font-size:125%">
    <div style="position:absolute; top:0px; left:0px; width:840px; height:120px">
        <img src="images/image01_bg.gif" alt="海外まとめてポン" />
    </div>
    <div style="position:absolute; top:30px">
        An easy option for overseas customers to shop at ●●●●<br />
        Multi-Product Shipping Services
    </div>
</div>

<div style="font-size:90%">
    <a href="proxy/index.html">
        [reliable and affordable] official purchasing agency services for overseas customers
    </a>
</div>
```

740b → `<base href="http://event.*******.co.jp/borderless/index.html" />`
720 → `<div style="position:relative; width:840px; height:120px; font-size:125%">`
730b → `An easy option for overseas customers to shop at ●●●●<br />`
710b → `<a href="proxy/index.html">`

```
<style type="text/css"><!--
    div.class_11 { color:transparent !important }
    img.class_21 { visibility:visible !important }
    img.class_22 { visibility:hidden !important }
--></style>

<div style="position:relative; width:840px; height:120px; font-size:125%">
    <div style="position:absolute; top:0px; left:0px; width:840px; height:120px">
        <img class="class_21" src="images/image01.gif" alt="海外まとめてポン" />
    </div>
    <div class="class_11" style="position:absolute; top:30px">
        ●●のショップでお買物をするお客様のための簡易なオプション<br />
        海外まとめてポン
    </div>
</div>

<div>
    <a href="proxy/index.html">
        【好評御礼】海外居住者向けお買い物代行サービス
    </a>
</div>
```

- 920a → `<div style="position:absolute; top:0px; left:0px; width:840px; height:120px">`
- 930a → `<div class="class_11" style="position:absolute; top:30px">`
- 910a → `<a href="proxy/index.html">`

(b)

```
<style type="text/css"><!--
    div.class_11 { color:transparent !important }
    img.class_21 { visibility:visible !important }
    img.class_22 { visibility:hidden !important }
--></style>

<base href="http://event.*******.co.jp/borderless/index.html" />

<div style="position:relative; width:840px; height:120px; font-size:125%">
    <div style="position:absolute; top:0px; left:0px; width:840px; height:120px">
        <img class="class_22" src="images/image01.gif" alt="海外まとめてポン" />
    </div>
    <div style="position:absolute; top:30px">
        An easy option for overseas customers to shop at ●●●●<br />
        Multi-Product Shipping Services
    </div>
</div>

<div style="font-size:90%">
    <a href="proxy/index.html">
        [reliable and affordable] official purchasing agency services for overseas customers
    </a>
</div>
```

- 940b → `</style>`
- 920b → `<div style="position:absolute; top:0px; left:0px; width:840px; height:120px">`
- 930b → `<div style="position:absolute; top:30px">`
- 910b → `<a href="proxy/index.html">`

Fig.16

```
<!DOCTYPE html
    PUBLIC "-//W3C//DTD XHTML 1.0 Transitional//EN"
    "http://www.w3.org/TR/xhtml1/DTD/xhtml1-transitional.dtd"
>

<html xmlns="http://www.w3.org/1999/xhtml">

<head>
<meta http-equiv="content-type" content="text/html; charset=Shift_JIS">
<meta http-equiv="Content-Style-type" content="text/css">
<title>test</title>
<link rel="stylesheet" href="test.css" type="text/css">
<style type="text/css"><!--
        div.class_11 { color:transparent !important }
        img.class_21 { visibility:visible !important }
        img.class_22 { visibility:hidden !important }
--></style>
</head>

<body>
<div id="all">
        <div id="image1"><img class="class_21" src="first.gif"></div>
        <div id="image2"><img class="class_22" src="test.gif"></div>

<div id="title"><div class="class_11"> 愛犬家にペット自慢をしてもらいました！ </div> </div>

<div id="region1"><div class="class_11"> 毎日一人ぼっちで留守番させて、我が家の
        犬には可哀想な思いをさせています。それにも関わらず、我が家の犬は、家族が
        仕事から帰ると毎日玄関まで迎えにきてくれるんです！ </div> </div>

<div id="region2"><div class="class_11"> 我が家の犬は、寝ているとき、人間のような
        いびきをかきます。 </div> </div>

<div id="region3"><div class="class_11"> 犬のいびきは世の中が平和であることを
        再認識させてくれて、とても穏やかな気持ちになれます。 </div> </div>

<div id="region4"><div class="class_11"> 我が家の犬は、食べ物に異常な執着心を
        燃やします。おやつを一回でもくれた人のことはずっと覚えているようで、次にその人
        に会った時には、しっぽを大きく振りながら近づいていきます。ちょっと恥ずかしいです。
        </div> </div>

</div>
</body>

</html>
```

Fig.17

```
*{
  margin: 0;
  padding: 0;
  font-style: normal;
  font-weight: normal;
} img { border:none;} div#all{
    position:relative;
    width:600px;
    height:345px;
    font-family:'HGP創英角ポップ体',sans-serif;
} div#image{
    position:absolute;
    top:0px;
    left:0px;
    width:600px;
    height:345px;
}
div#title{
    position:absolute;
    top:10px;
    left:11px;
    text-align:center;
    font-size:40px;
    line-height:40px;
    font-weight:bold;
    width:581px;
    height:92px;
    color:#ffffff;
}
div#region1{
    position:absolute;
    top:150px;
    left:165px;
    text-align:left;
    font-size:15px;
    line-height:20px;
    font-weight:bold;
    width:400px;
    height:30px;
    color:#400001;
}
div#region2{
    position:absolute;
    top:354px;
    left:118px;
    text-align:left;
    font-size:15px;
    line-height:20px;
    font-weight:bold;
    width:231px;
    height:30px;
    color:#400001;
}
```

```
div#region3{
    position:absolute;
    top:414px;
    left:71px;
    text-align:left;
    font-size:15px;
    line-height:20px;
    font-weight:bold;
    width:333px;
    height:65px;
    color:#400001;
}
div#region4{
    position:absolute;
    top:621px;
    left:141px;
    text-align:left;
    font-size:15px;
    line-height:20px;
    font-weight:bold;
    width:400px;
    height:30px;
    color:#400001;
}
```

MACHINE TRANSLATION OF A WEB PAGE HAVING AN IMAGE CONTAINING CHARACTERS

CROSS REFERENCE TO RELATED APPLICATIONS

This application is a National Stage of International Application No. PCT/JP2010/060882, filed on Jun. 25, 2011, the contents of all of which are incorporated herein by reference in their entirety.

TECHNICAL FIELD

The present invention relates to a mechanism for translating a document mechanically, and more particularly, to a system for translating text displayed in a web page in real time.

BACKGROUND ART

As a device that mechanically translates text in a web page, a device that translates a character portion of an image is known (e.g. see Patent Literature 1). The device described in Patent Literature 1 creates an image in which only a character portion of image data containing both an image and characters has been translated, according to the following procedure. First, a part in which character data is present (a character area) in the image data containing both the image and the characters is specified. Next, the character data is extracted from the character area and converted into text data. Also, the text data is translated and translated data is adjusted and attached to the character area. Lastly, the character area to which the translation data has been attached is combined with the original image data (see a flowchart of FIG. 2 and illustrative diagrams of FIGS. 3 to 10 in Patent Literature 1).

CITATION LIST

Patent Literature

[Patent Literature 1] Japanese Patent Application Laid-Open Publication No. 2003-122751

SUMMARY OF INVENTION

Technical Problem

For a user, it is convenient for a web page to be displayed using a language used by a user when service is provided through the Internet. However, preparation of patterns of each language for all web pages is time-consuming and unrealistic.

On the other hand, creating a web page in a predetermined language in advance, translating text in the web page to a language used by a user in real time, for example, using a device capable of machine translation, and providing the translated web page can be considered.

However, images are often arranged in a web page that provides service, and characters are often contained in the images (110a in FIG. 1(a); here, Japanese characters). Accordingly, characters in the image are not translated by simple machine translation of only text data (110b in FIG. 1(b); here, translation to English). In this case, for example, since characters in an image are also translated using the device described in Patent Literature 1, machine translation can be carried out without damaging the beauty of an appearance of a web page and a layout of the web page.

However, in the device described in Patent Literature 1, it takes a long processing time for the characters in the image to be appropriately extracted and translated. Accordingly, the device described in Patent Literature 1 cannot be adopted for real-time translation service.

The present invention has been made to resolve such a problem, and an object of the present invention is to provide a machine translation system, a machine translation method, a machine translation program and a recording medium having the machine translation program recorded thereon, which are capable of maintaining a visual appearance of a translation target page before and after a translation process and realizing a high-speed translation process for characters contained in an image.

Solution to Problem

In other words, a machine translation system according to the present invention is a machine translation system that translates text of a web page that is a translation target represented in a predetermined language, to another language and provides the translated web page, wherein the machine translation system is capable of being connected to: web data storage means configured to store HTML data in which a structure of the web page that is a translation target is described and the image data referenced by the HTML data; and translation data storage means configured to store dictionary data used for a text translation process, wherein the HTML data contains a set of a description about a visualized image containing characters, a description about a background image whose display position is set to a predetermined position corresponding to a display position of the image and which is un-visualized and contains no characters, and a description about un-visualized text in a predetermined language whose display position is set to a front of a predetermined position superimposed on the background image, and wherein the machine translation system comprises: translation request reception means configured to receive a translation request from a terminal of a user viewing the web page, the translation request containing a URL corresponding to the web page that is a translation target and designation data designating a language after translation; HTML data acquisition means configured to acquire the HTML data in which a structure of the web page corresponding to the URL contained in the translation request is described, from the web data storage means; translation means configured to translate text contained in the HTML data acquired by the HTML data acquisition means to the language after translation corresponding to the designation data contained in the translation request with reference to the dictionary data stored in the translation data storage means; visualized element switching means configured to visualize the un-visualized text and the background image contained in the HTML data acquired by the HTML data acquisition means and un-visualize the visualized image contained in the HTML data; translated HTML data transmission means configured to reconstruct the HTML data acquired by the HTML data acquisition means using the text translated by the translation means and transmit the reconstructed HTML data to the terminal; and image data transmission means configured to read the designated image data from the web data storage means and transmit the image data to the terminal in response to a transmission request designating the image data from the terminal.

The visualized element switching means may visualize un-visualized text by changing a character color attribute of text from transparent to colored, changing a display attribute of an area containing text from non-display to display, or deleting comment tags having tags of the area containing the text interposed therebetween.

The visualized element switching means may visualize the un-visualized background image by changing a display attribute of the background image from non-display to display, changing a display attribute of an area containing the background image from non-display to display, or deleting comment tags having tags corresponding to the background image interposed therebetween.

The visualized element switching means may un-visualize the visualized image by changing a display attribute of the image from display to non-display, deleting tags corresponding to the image, interposing tags corresponding to the image between comment tags, changing a display attribute of an area containing the image from display to non-display, or interposing tags corresponding to the area containing the image between comment tags.

The translated HTML data transmission means may change a reference URL of the HTML data acquired by the HTML data acquisition means into the URL of the web page, which is a translation target, contained in the translation request.

The translated HTML data transmission means may correct a length of the text translated by the translation means to be small when the length of the text translated by the translation means is greater than a length of predetermined text contained in the HTML data acquired by the HTML data acquisition means by a certain value or more.

Further, a machine translation method according to the present invention is a machine translation method in a machine translation system that translates a web page that is a translation target represented in a predetermined language, to another language and provides the translated web page, wherein the machine translation system is capable of being connected to: web data storage means configured to store HTML data in which a structure of the web page that is a translation target is described and the image data referenced by the HTML data; and translation data storage means configured to store dictionary data used for a text translation process, wherein the HTML data contains a set of a description about a visualized image containing characters, a description about a background image whose display position is set to a predetermined position corresponding to a display position of the image and which is un-visualized and contains no characters, and a description about un-visualized text in a predetermined language whose display position is set to a front of a predetermined position superimposed on the background image, and wherein the machine translation system executes: a translation request reception step of receiving a translation request from a terminal of a user viewing the web page, the translation request containing a URL corresponding to the web page that is a translation target and designation data designating a language after translation; an HTML data acquisition step of acquiring the HTML data in which a structure of the web page corresponding to the URL contained in the translation request is described, from the web data storage means; a translation step of translating text contained in the HTML data acquired in the HTML data acquisition step to the language after translation corresponding to the designation data contained in the translation request with reference to the dictionary data stored in the translation data storage means; a visualized element switching step of visualizing the un-visualized text and the background image contained in the HTML data acquired in the HTML data acquisition step and un-visualizing the visualized image contained in the HTML data; a translated HTML data transmission step of reconstructing the HTML data acquired in the HTML data acquisition step using the text translated in the translation step and transmitting the reconstructed HTML data to the terminal; and an image data transmission step of reading the designated image data from the web data storage means and transmitting the image data to the terminal in response to a transmission request designating the image data from the terminal.

Further, a machine translation program according to the present invention is configured as a program for causing each means included in any of the machine translation systems to be realized as a function in one or a plurality of computers.

Further, a recording medium according to the present invention is a computer-readable recording medium and is configured as a recording medium having a machine translation program recorded thereon for causing each means included in any of the machine translation systems to be realized as a function in one or a plurality of computers.

Advantageous Effects of Invention

The machine translation system of the present invention stores, in the web data storage means, HTML data that contains at least a set of reference data (URL) of a visualized image containing characters, reference data (URL) of an un-visualized background image containing no characters whose display position is set to an area corresponding to a display position of the image, and text data, and visualizes the un-visualized background image data and the text data so that a display position of the text data is located in front of a display position of the background image and un-visualizes image data of the visualized image in a translation process.

Thus, as the web page has a partially 3-layered configuration (a layer of the visualized image containing characters, a layer of the un-visualized image containing no characters, and a layer of the un-visualized text), an image containing characters can be displayed before translation, resulting in a beautiful appearance and high display speed. Further, as elements displayed in a translation process are switched, the background image and text after translation are displayed in an area in which the image containing characters has been displayed when the web page (HTML data) is subjected to the machine translation. Accordingly, an event that characters in an image are directly displayed without being translated can be resolved, and a visual appearance of a translation target page can be maintained before and after the translation process.

BRIEF DESCRIPTION OF DRAWINGS

FIG. 3 is a diagram illustrating (a-1) a part of a web page before translation, (a-2) un-visualized image data contained in the web page before translation, (a-3) un-visualized text data contained in the web page before translation, and (b) a part of a web page after translation;

FIG. 6 is a diagram illustrating (a) a part of an HTML source before translation and (b) a part of an HTML source after translation;

FIG. 10 is a diagram illustrating (a) a part of an HTML source before translation and (b) a part of an HTML source after translation (variant 1).

FIG. 12 is a diagram illustrating (a) a part of an HTML source before translation and (b) a part of an HTML source after translation (variant 2);

FIG. 16 illustrates an example in which a source of HTML data is described (another embodiment);

FIG. 17 illustrates an example in which a source of a style sheet is described (another embodiment);

DESCRIPTION OF EMBODIMENTS

Definition

Meanings of terminologies used in the following description are defined as follows:

Machine translation . . . Translation performed automatically using a computer or the like without human intervention.

Visualization . . . A concept including a process for allowing an object to be visible to a user.

Un-visualization . . . A concept including a process for allowing an object to be invisible to a user. For example, a type of a process such as a process of setting to non-display, a process of setting to transparent, a process of deleting an element, or a process of commenting out an element is considered.

EMBODIMENTS

1. Overview of Embodiment

An overview of the present embodiment will be described with reference to FIGS. 2 to 7. A system of the present embodiment is a system that provides a service of translating a part displayed in a first language (a predetermined language) within a web page, to a second language (another language) designated (selected) by each user viewing the web page (machine translation service) to the user. Further, an example in which a Japanese part within a web page is translated to English is used in the following description.

1-1. Configuration of System

Figure 1:
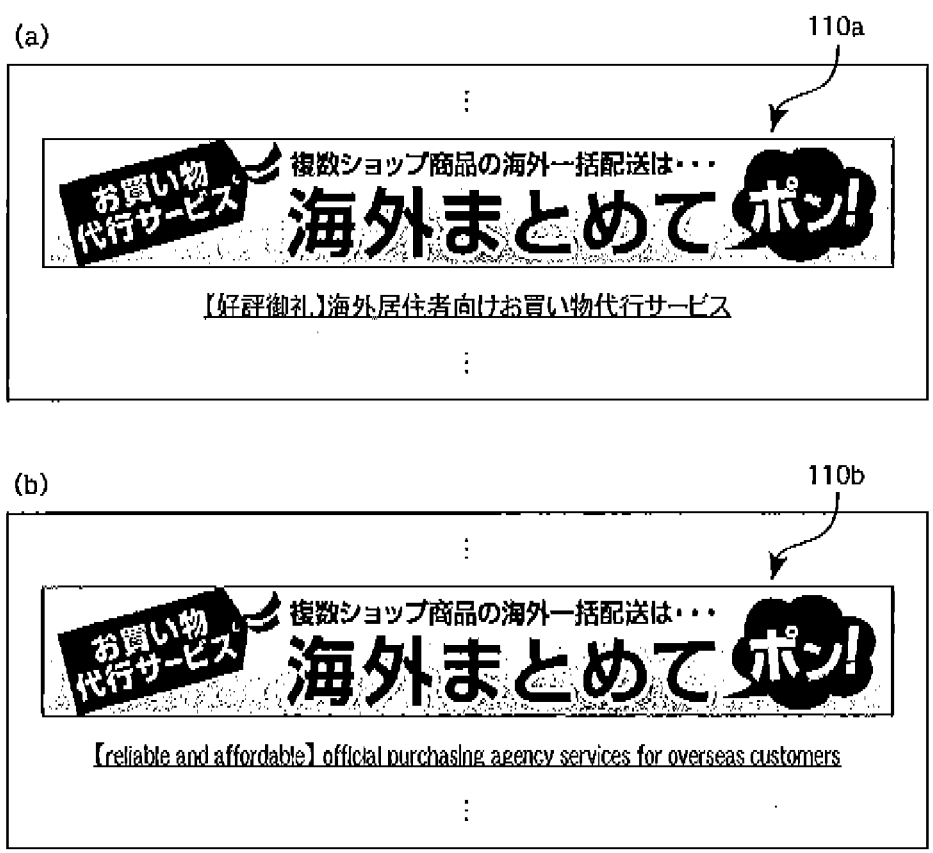
FIG. 1 is a diagram illustrating (a) a part of a web page before translation and (b) a part of a web page after translation (an example of related art)
Figure 2:
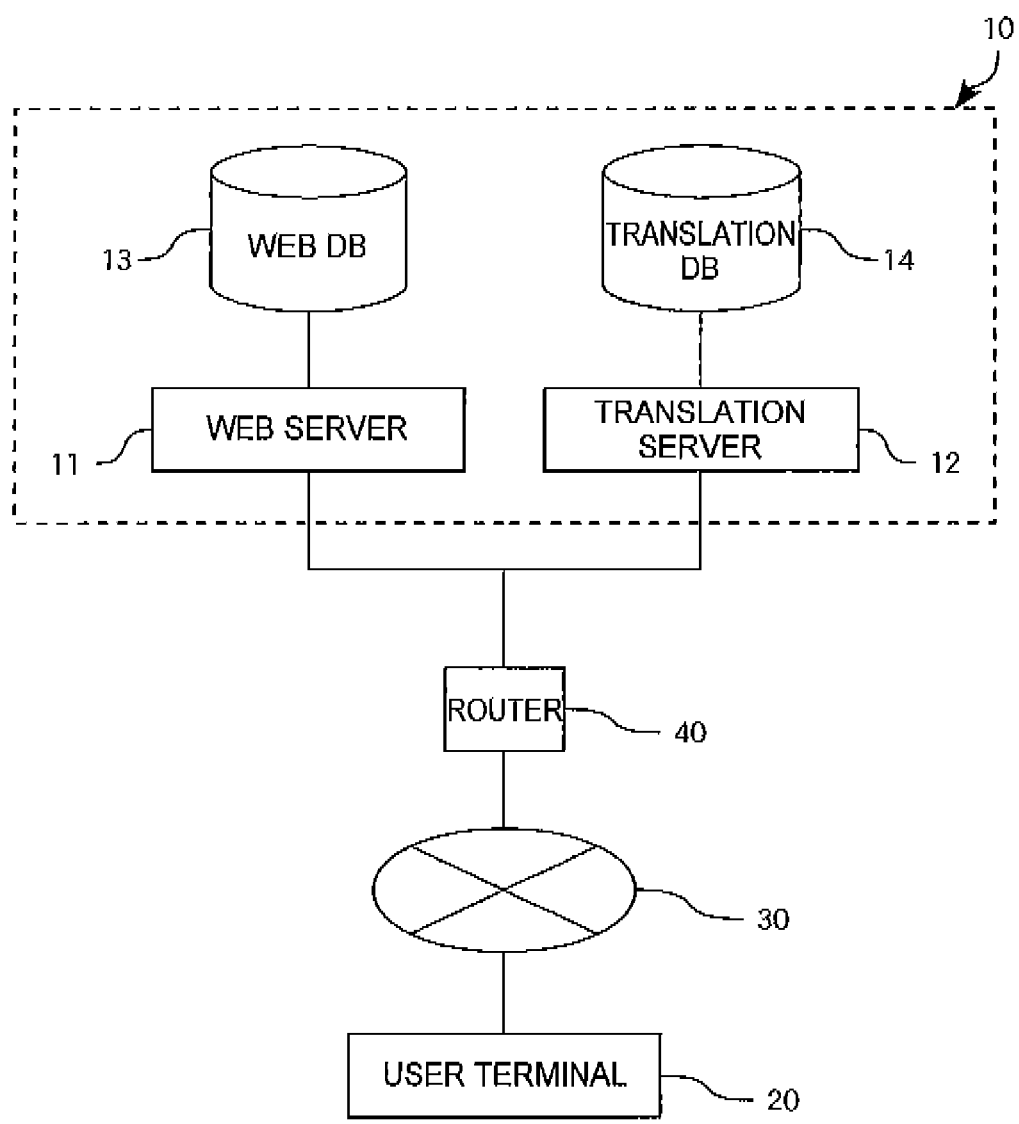
FIG. 2 is a diagram illustrating an example of a configuration of a system according to an embodiment.

As illustrated in FIG. 2, the system of the present embodiment includes, as a whole, a web server 11 that provides web pages, a translation server 12 that performs a translation process, and a user terminal 20 having a web browser. The web server 11 may be connected to a web DB (web data storage means) 13 that at least stores HTML data for describing a structure of the web page and data (e.g., image data) referenced by the HTML data. Meanwhile, the translation server 12 may be connected to a translation DB (translation data storage means) 14 that at least stores dictionary data referenced in a machine translation process for a web page.

Each of the web server 11 and the translation server 12 is configured as a general computer including a CPU, a ROM, a RAM, a hard disk, a communication device, and the like. The user terminal 20 includes a manipulation unit that receives a manipulation from a user and a display unit capable of displaying web pages, in addition to the above components.

Further, the dictionary data stored in the translation DB 14 is assumed to contain data defining vocabulary or grammar or models built using a statistical learning scheme. Data that defines a specific translational equivalent for a specific phrase may also be stored. In the present embodiment, while the web DB 13 and the translation DB 14 are built in external storage devices respectively connected to the web server 11 and the translation server 12, the web DB 13 and the translation DB 14 may be built in a storage device embedded in the web server 11 or the translation server 12 as long as stored information can be read.

The web server 11 and the translation server 12 are connected to each other by a communication network (in the present embodiment, a private network such as a LAN) to form a machine translation system 10. Further, the user terminal 20 is connected to the web server 11 and the translation server 12 via a communication network (in the present embodiment, the Internet 30). Further, communication among the web server 11, the translation server 12, and the user terminal 20 is controlled by a router 40.

1-2. Primary Characteristics of Embodiment

Primary characteristics of the embodiment are that HTML data that contains at least a set of reference data (URL) of a visualized image containing characters, an un-visualized image containing no characters (a background image) whose display position is set to an area corresponding to a display position of the image, and text data is stored in the web DB 13, and the un-visualized background image data and the text data are visualized so that a display position of the text data is located in front of a display position of the background image and the visualized image data is un-visualized in a translation process.

Thus, as the web page has a partially 3-layered configuration (a layer of the visualized image containing characters, a layer of the un-visualized background image containing no characters, and a layer of the un-visualized text), the image containing characters can be displayed before translation, resulting in a beautiful appearance of the web page and high display speed. Further, as elements displayed in a translation process are switched, the background image and text after translation are displayed in an area in which the image containing characters was displayed when the web page (HTML data) is subjected to machine translation. Accordingly, an event that characters in an image are directly displayed without being translated can be resolved, and a visual appearance of a translation target page can be maintained before and after the translation process.

In FIG. 3, parts of web pages before and after translation in an embodiment are illustrated. Normal text 510a and an image 520 containing Japanese characters are displayed in a web page before translation (FIG. 3(a-1)). Further, the web page before translation contains an image 540 whose display position is set to an area corresponding to a display position of the image 520 (or an area superimposed on the image 520) and which is un-visualized and contains no characters (FIG. 3(a-2)). The web page before translation also contains Japanese text data 530a whose display position is set to the area superimposed on the image 540 and which is un-visualized (FIG. 3(a-3)).

Meanwhile, text 510b obtained by translating the text 510a to English, the image 540, and text 530b obtained by translating the text 530a to English are displayed in a web page after translation (FIG. 3(b)). Further, since the image 520 is un-visualized, the image 520 is invisible within the web page after translation.

2. Machine Translation Procedure 2-1. Overview of Machine Translation Procedure

Figure 4:
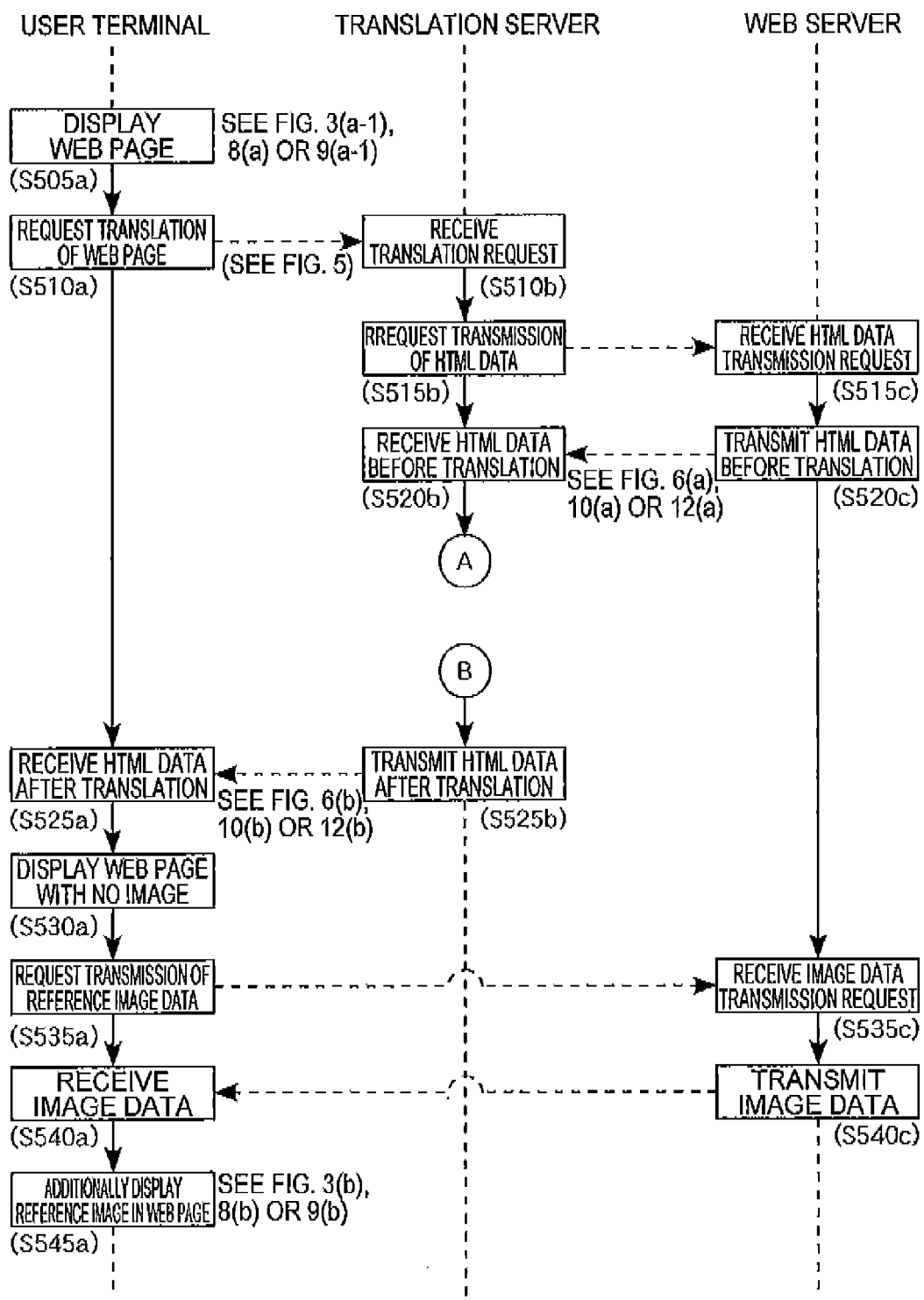
FIG. 4 is a sequence chart illustrating a machine translation procedure of the system illustrated in FIG. 2.

A flow of a machine translation process and a flow of data in the system of the present embodiment will be briefly described with reference to a sequence chart of FIG. 4. As illustrated in FIG. 4, the web server 11 and the translation server 12 in the machine translation system 10 display a web page after translation on the user terminal 20 according to the following procedures 1 to 4. Further, numerals of other drawings, which are referenced, are supplementally described in the sequence chart of FIG. 4. Further, it is assumed that, prior to execution of procedure 1, HTML data describing a structure of the web page and the data referenced by the HTML data are stored in the web DB 13 by the web server 11, and dictionary data referenced in a machine translation process for a web page is stored in the translation DB 14 by the translation server 12.

(Procedure 1)

It is assumed that the user terminal 20 has displayed the web page provided from the web server 11 (S505a) and the web page is a translation target web page (FIG. 3(a-1)). It is also assumed that an element for selecting a language after translation and requesting the translation (e.g., a set of a pull-down, a radio button, a pull-down or a radio button, and a button, an image or a link) is displayed in the web page that is the translation target. If a user performs a predetermined manipulation to designate (select) the language after translation on the web page, which is the translation target, and request the translation, the user terminal 20 requests the translation server 12 to translate the web page (S510a).

Figure 5:
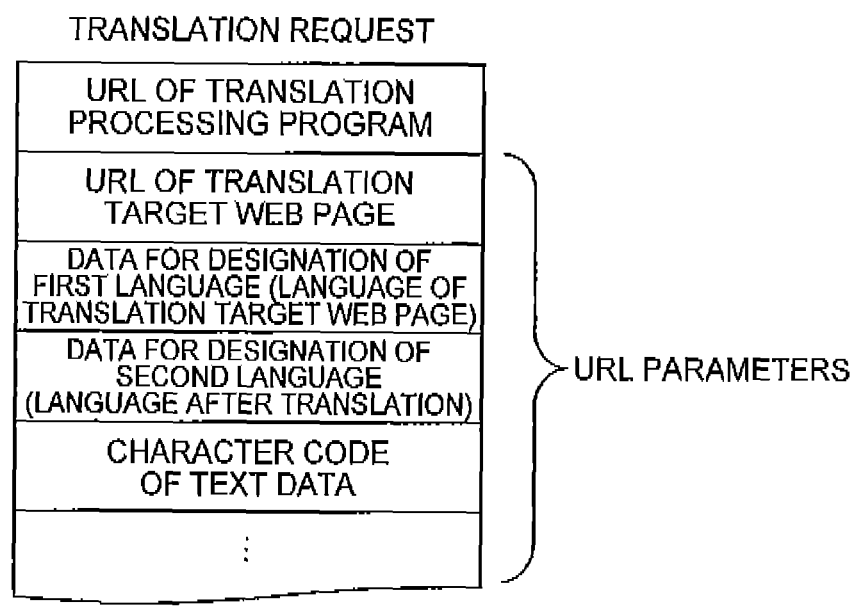
FIG. 5 is a diagram illustrating primary items of a translation request.

FIG. 5 illustrates primary items of a translation request. "URL of translation processing program," "URL of translation target web page," "data for designation of first language (language of translation target web page)," "data for designation of second language (language after translation)" and "character code of text data" are contained in the translation request. In the present embodiment, an HTTP request having "URL of a translation target web page," "data for designation of first language (language of translation target web page)," "data for designation of second language (language after translation)" and "character code of text data" as URL parameters is the translation request. Further, each item illustrated in FIG. 5 may be transmitted in another format.

(Procedure 2)

When the translation server 12 receives the translation request from the user terminal 20 (S510b; translation request reception step), the translation server 12 requests the web server 11 to transmit HTML data corresponding to the received "URL of translation target web page" (S515b). When the web server 11 receives the HTML data transmission request from the translation server 12 (S515c), the web server 11 reads the HTML data (HTML data before translation) corresponding to the received "URL of translation target web page" from the web DB 13 or creates the HTML data, and transmits the HTML data to the translation server 12 (S520c; HTML data acquisition step).

(Procedure 3)

When the translation server 12 receives the HTML data before translation from the web server 11 (S520b), the translation server 12 executes a machine translation process for the received HTML data before translation, which is a target, and transmits HTML data after translation, i.e., reconstructed HTML data, to the user terminal 20 (S525b; translated HTML data transmission step). Further, a flow of the machine translation process and the HTML data before and after translation will be described in detail in other items (see FIGS. 6 and 7 that will be described later).

(Procedure 4)

When the user terminal 20 receives the HTML data after translation from the translation server 12 (S525a), the user terminal 20 interprets the received HTML data, displays a web page with no image (S530a), and requests the web server 11 to transmit image data referenced by the HTML data (S535a). When the web server 11 receives the image data transmission request (S535c), the web server 11 reads the designated image data from the web DB 13 and transmits the image data to the user terminal 20 (S540c; image data transmission step). When the user terminal 20 receives the image data from the web server 11 (S540a), the user terminal 20 additionally displays the image in a predetermined position within the previously displayed web page (S545a). The web page after display completion is as described above (FIG. 3(b)).

As described above, in the present embodiment, the translation server 12 functions as the translation request reception means and the translated HTML data transmission means, and the web server 11 functions as the HTML data acquisition means and the image data transmission means.

2-2. Machine Translation Processing Procedure of Embodiment (a) HTML Data Before Translation In FIG. 6(a), a part of the HTML data before translation in an embodiment is illustrated. Japanese text data 915a, as well as the reference data 925a and 955a of the image and Japanese text data 935a is contained in the HTML data before translation. Further, styles are set in some tags by style sheets (CSS format). The text data 915a and the reference data 925a of the image correspond to the text 510a and the image 520 of the web page before translation (FIG. 3(a-1)), respectively. Further, the reference data 955a of the image and the text data 935a correspond to the image data 540 (FIG. 3(a-2)) and the text data 530a (FIG. 3(a-3)) that are un-visualized in the web page before translation.

The image referenced by the reference data 925a of the image is set to be displayed with a width of 840 pixels and a height of 120 pixels in a position of 0 pixels from the top of a predetermined area (having a width of 840 pixels and a height of 120 pixels) and 0 pixels from the left, with an upper left vertex being aligned.

Meanwhile, the image referenced by the reference data 955a of the image is set to be displayed with a width of 840 pixels and a height of 120 pixels in a position of 0 pixels from the top of a predetermined area (having a width of 840 pixels and a height of 120 pixels) and 0 pixels from the left, with an upper left vertex being aligned. In other words, a display position of the image is set to the same position as the image referenced by the reference data 925a. However, since the image corresponding to the reference data 955a is un-visualized (a value of a display attribute is set to non-display (hidden)), the data is invisible within the window of the web browser. Also, the text corresponding to the text data 935a is set to be displayed in a position of 30 pixels from the top of a predetermined area (having a width of 840 pixels and a height of 120 pixels) (here, for example, to be centered). In other words, the display position of the text is set to the same position as the image referenced by the reference data 955a. However, since the text corresponding to the text data 935a is un-visualized (a value of a character color attribute is set to transparent), the text is invisible within the window of the web browser.

Further, since the elements in the web page are superimposed in an HTML describing order (an element described in the back is displayed on the front), a superposing order is not particularly set in the example of FIG. 6(a), but the superposing order may be set explicitly. The superposing order may be set according to, for example, a size of a (numerical) value of an attribute "z-index."

<(b) Translation Process>

Figure 7:
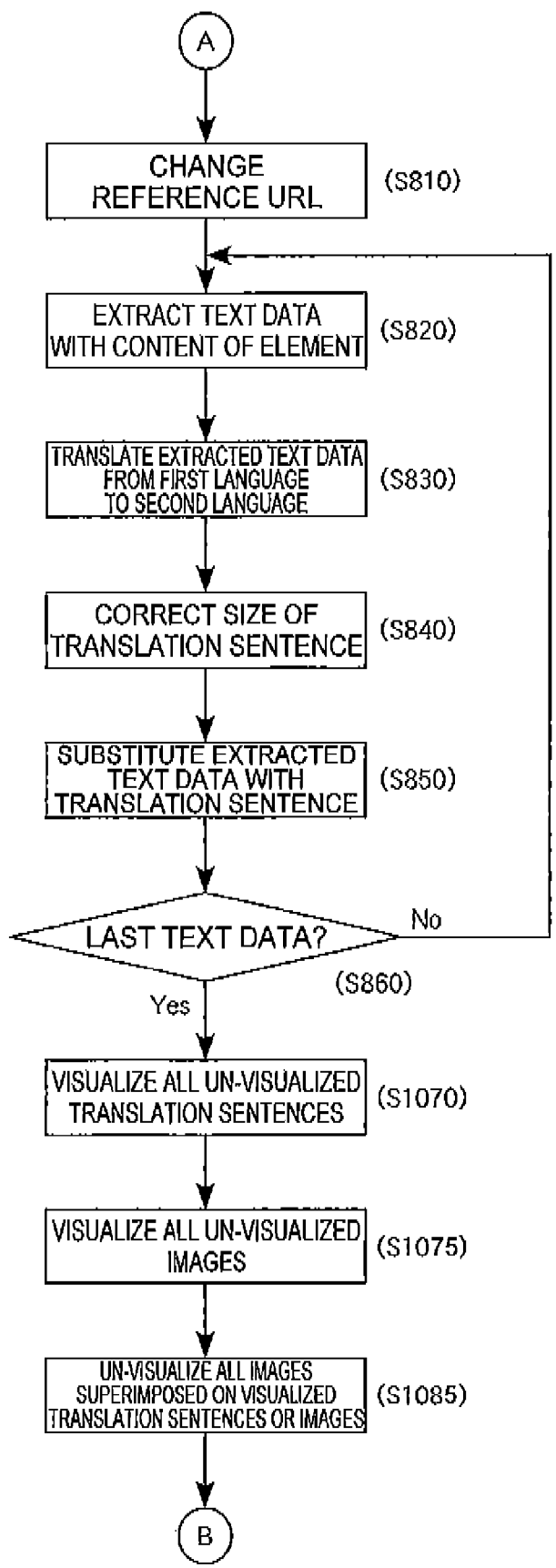
FIG. 7 is a flowchart illustrating a flow of a translation process.

A flow of the translation process in an embodiment will be described in detail with reference to a flowchart of FIG. 7. As illustrated in FIG. 7, the translation server 12 translates the HTML data according to the following procedures 31 to 34.

(Procedure 31)

A reference URL of the HTML data is changed (S810). Specifically, a reference URL for a URL of reference data or the like described in a relative URL format (e.g., a value of an src attribute in the reference data 925a and 955a (FIG. 6(a))) is described in an absolute URL format as a value of an href attribute of a <base> tag. Here, "URL of translation target web page" contained in the search request (FIG. 5) received from the user terminal 20 is used as the reference URL. Further, when it is assumed that URLs within the HTML data are all described in the absolute URL format, a process of changing a reference URL may be omitted. Further, even when all URLs described in the relative URL format are individually rewritten in the absolute URL format, the same effect can be obtained.

(Procedure 32)

One string of text data with content of the element within the HTML data is extracted (S820), and the extracted text data (original sentence) is translated from "a first language" to "a second language" to create a translation sentence (S830; translation step). Further, the translation server 12 references the dictionary data stored in the translation DB 14 when translating the text.

(Procedure 33)

A size of the translation sentence is corrected as necessary (S840) and the extracted text data is substituted with the translation sentence (S850). For example, lengths of character strings before and after translation may be compared to correct a length of the translation sentence. Specifically, when a difference between the lengths of character strings before and after translation is greater than or equal to a predetermined value (a certain value), the length of the translation sentence is corrected to be small according to the difference. Further, a phrase satisfying a predetermined condition may be extracted from the translation sentence and substituted with an abbreviation created using a predetermined method. In this case, a web page describing a definition of the abbreviation may be separately created and a link to the web page describing the definition of the abbreviation may be displayed in the web page after translation. Further, when the abbreviation is pointed to by a pointer, an abbreviation target phrase may be displayed as a pop-up.

(Procedure 34)

A determination is made as to whether the translated text data is last text data with content of the element within the HTML data (S860). Specifically, next text data with the content of the element within the HTML data is searched for, and when the next text data is not detected, immediately previous translated text data is determined to be the last text data. When the text data is not the last text data (No in S860), the process returns to procedure 32 in which the extraction and substitution processes (procedures 32 and 33)) are iteratively performed on the next text data. On the other hand, when the text data is the last text data (Yes in S860), the procedure exits a loop.

(Procedure 35)

All un-visualized translation sentences are visualized (S1070; visualized element switching step) and all un-visualized images are visualized (S1075; visualized element switching step). For example, a class attribute of a tag "<div>" whose value of the class attribute is "class_11" in the example of FIG. 6(a) is deleted. Accordingly, the text corresponding to the text data 935a (explicitly un-visualized text) inherits an attribute of a parent element in a state in which the text is translated to English, and is visualized (a character color attribute is changed from transparent to colored). Further, the value of the class attribute of a tag "<img>" whose value of the class attribute is "class_22" is changed into "class_21." Accordingly, the image corresponding to the reference data 955a of the image (an explicitly un-visualized background image) is explicitly visualized (the display attribute is changed from non-display to display). Also, all images superimposed on the translation sentences or the drawings visualized in the process of S1070 and S1075 are un-visualized (S1085; visualized element switching step). For example, a value of the class attribute of the tag "<img>" whose value of the class attribute is "class_21" in the example of FIG. 6(a) is changed into "class_22." Accordingly, an image (explicitly visualized image) corresponding to the reference data 925a of the image is explicitly un-visualized (the display attribute is changed from display to non-display). Further, the visualization of the translation sentence and/or the un-visualization of the image may be performed by applying the class attributes all at once as described above or may be individually performed for each tag.

<(c) HTML Data after Translation>

In FIG. 6(b), a part of HTML data after translation in an embodiment is illustrated. FIG. 6(b) illustrates HTML data after the HTML data of FIG. 6(a) is translated through the process illustrated in the flowchart of FIG. 7.

Text data 915b obtained by translating the text data 915a to English, reference data 925b obtained by un-visualizing the reference data 925a, reference data 955b obtained by visualizing the reference data 955a, and visualized text data 935b obtained by translating the text data 935a to English are contained in the HTML data after translation. Further, a tag 945b that specifies a reference URL is added. The text data 915b and the text data 935b correspond to the text 510b and the text 530b of the web page after translation (FIG. 3(*b*)), respectively. Further, a character size of the text data 915b is corrected to 90% of a normal size through the correction process in procedure 33 (S840 in FIG. 7). Other data settings are unchanged except for particularly specified settings.

In the present embodiment, the translation server 12 functions as the translation means and the visualized element switching means, as described above.

3. Variants

3-1. Overview of Variants

Hereinafter, two variants will be described. Further, systems in variants 1 and 2 are configured similar to the system in the embodiment, and they differ only in the flow of the machine translation process and the HTML data before and after translation. Accordingly, hereinafter, such differences will be mainly described in consideration of ease of understanding of a description.

<(a) Primary Characteristic in Variant 1>

A primary characteristic in variant 1 is that HTML data that contains at least a set of reference data (URL) of an image with no characters and text data whose display position is set to the front of an area superimposed on the image is stored in the web DB 13. Thus, as a web page has a partially 2-layered configuration (a layer of the image with no characters and a layer of the text), the text after translation is displayed in front of the area superimposed on the image with no characters when the web page (HTML data) is subjected to machine translation. In this regard, an event that characters in an image are directly displayed without being translated is resolved.

Figure 8:
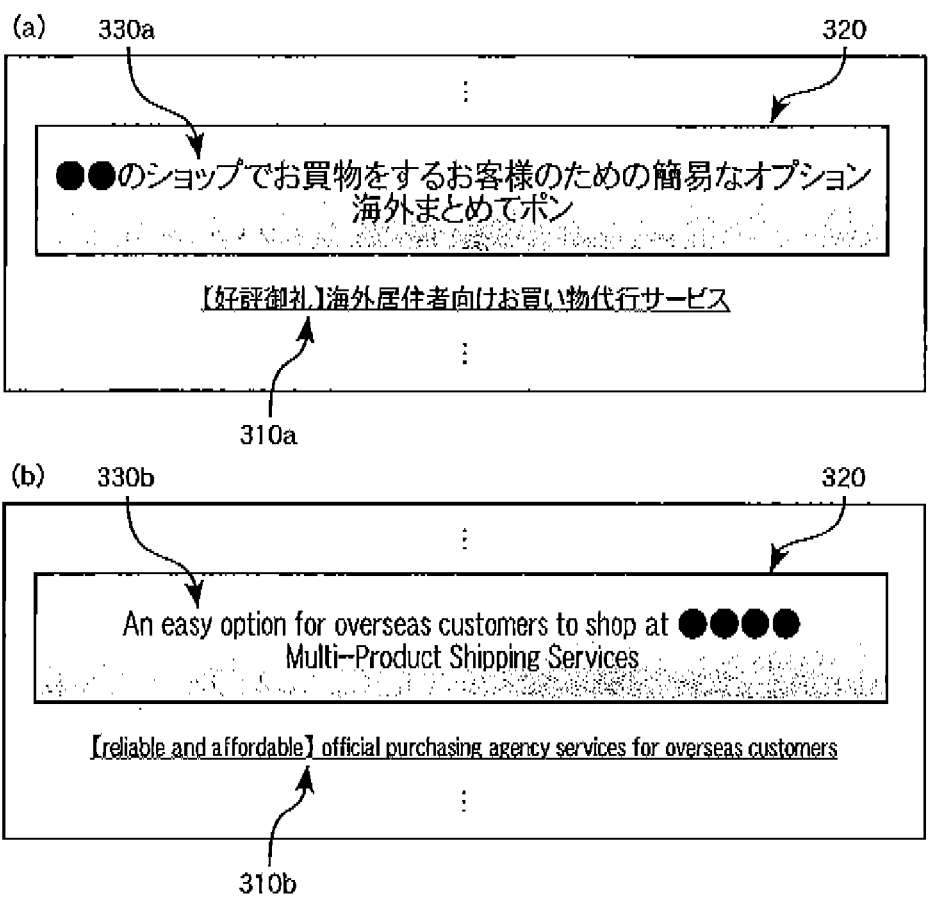
FIG. 8 is a diagram illustrating (a) a part of the web page before translation and (b) a part of the web page after translation (variant 1)

In FIG. 8, parts of web pages before and after translation in variant 1 are illustrated. An image with no characters 320, and Japanese text 330a whose display position has been set to the front of an area superimposed on the image 320, as well as normal Japanese text 310a, are displayed in the web page before translation (FIG. 8(*a*)). Meanwhile, text 310b obtained by translating the text 310a to English, an image 320 unchanged before and after translation, and text 330b obtained by translating the text 330a to English are displayed in the web page after translation (FIG. 8(*b*)).

<(b) Primary Characteristic of Variant 2>

A primary characteristic of variant 2 is that HTML data that contains at least a set of reference data (URL) of a visualized image containing characters and text data whose display position is set to an area superimposed on the image and which is un-visualized is stored in the web DB 13, and the un-visualized text data is visualized and the visualized image data is un-visualized in a translation process. Thus, as the web page has a partially 2-layered configuration (a layer of the image containing characters and a layer of the un-visualized text) and a displayed layer is switched in the translation process, text after translation is displayed in an area in which the image containing characters is displayed when the web page (HTML data) is subjected to machine translation. In this regard, an event that characters in an image are directly displayed without being translated is resolved.

Figure 9:
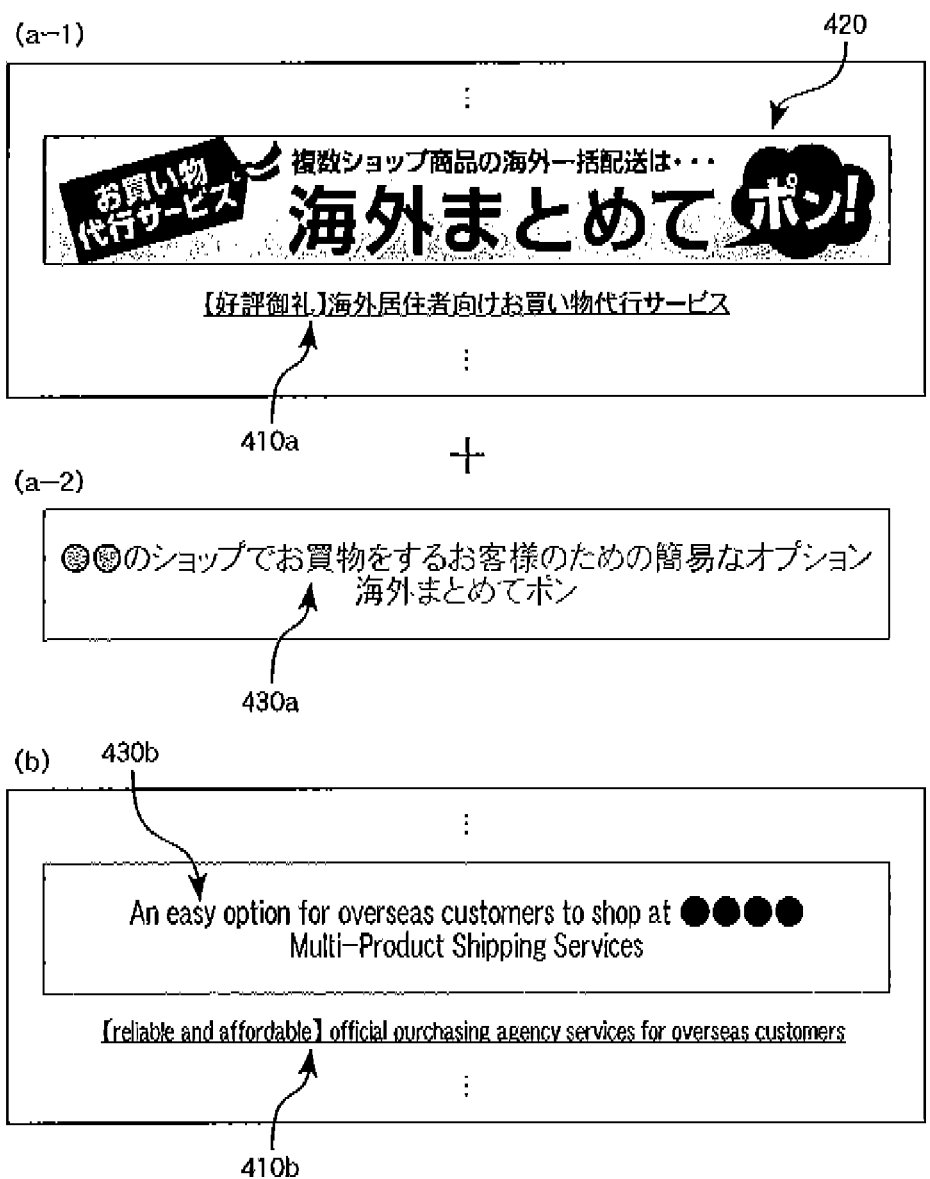
FIG. 9 is a diagram illustrating (a-1) a part of a web page before translation, (a-2) un-visualized data contained in the web page before translation, and (b) a part of a web page after translation (variant 2)

FIG. 9 illustrates parts of web pages before and after translation in variant 2. Normal Japanese text 410a and an image 420 containing characters are displayed in the web page before translation (FIG. 9(*a*-1)). Further, the web page before translation includes Japanese text data 430a whose display position is set to an area superimposed on the image 420 and which is un-visualized (FIG. 9(*a*-2)). Meanwhile, text 410b obtained by translating the text 410a to English and text 430b obtained by translating the text 430a to English are displayed in the web page after translation (FIG. 9(*b*)). Further, since the image 420 is un-visualized, the image 420 is invisible within the web page after translation.

<(c) Machine Translation Procedure in Variant>

A flow of a machine translation process and a flow of data in the system in the variant are the same as the flow of the machine translation process and the flow of the data in the system in the embodiment (FIG. 4). Further, the system in the variant is also the same as the system in the embodiment in the primary items of the translation request (FIG. 5).

3-2. Translation Process in Variant 1

<(a) HTML Data Before Translation>

FIG. 10(*a*) illustrates a part of HTML data before translation in variant 1. Reference data 720 of an image and Japanese text data 730a, in addition to Japanese text data 710a, are contained in the HTML data before translation. Further, styles are set for some tags by style sheets (CSS format). The text data 710a, the reference data 720 of the image, and the text data 730a correspond to the text 310a, the image 320, and the text 330a of the web page before translation (FIG. 8(*a*)), respectively.

An image referenced by the reference data 720 of the image is set to be displayed with a width of 840 pixels and a height of 120 pixels in a position of 0 pixels from the top of a predetermined area (having a width of 840 pixels and a height of 120 pixels) and 0 pixels from the left, with an upper left vertex being aligned. Meanwhile, text corresponding to the text data 730a is set to be displayed as usual in a position of 30 pixels from the top of a predetermined area (having a width of 840 pixels and a height of 120 pixel) (here, to be centered). Accordingly, the image and the text are displayed to be superimposed on each other in the predetermined area. Further, since the elements in the web page are superimposed in an HTML for describing order (an element described in the back is displayed on the front), a superposing order is not particularly set in the example of FIG. 10(*a*), but the superposing order may be set explicitly. The superposing order may be set according to, for example, a size of a (numerical) value of an attribute "z-index."

<(b) Translation Process>

Figure 11:
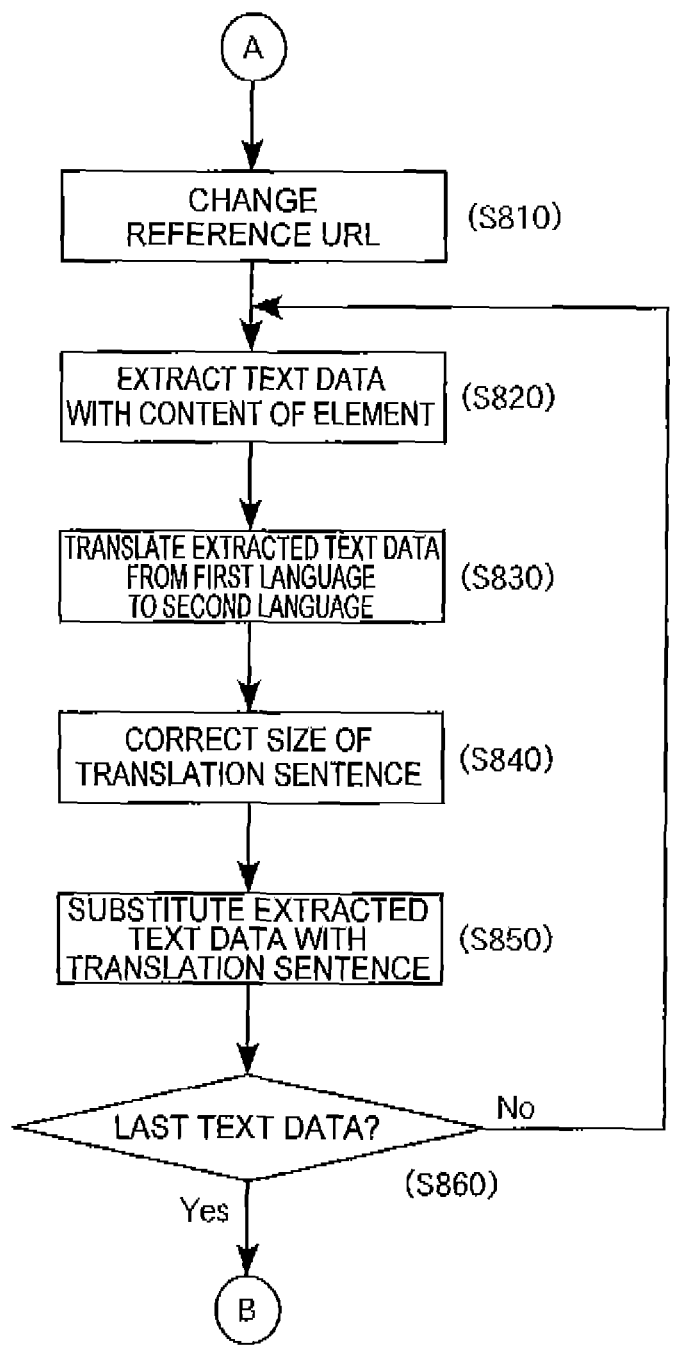
FIG. 11 is a flowchart illustrating a flow of a translation process (variant 1)

A flow of a translation process in variant 1 is illustrated in a flowchart of FIG. 11. Further, in the flowchart of FIG. 11, a process with the same reference numeral as the process illustrated in the flowchart of FIG. 7 is the same process as the process illustrated in the flowchart of FIG. 7. As illustrated in FIG. 11, the translation server 12 translates the HTML data according to the procedures 31 to 34 (as in the embodiment).

<(c) HTML Data After Translation>

In FIG. 10(*b*), a part of HTML data after translation in variant 1 is illustrated. FIG. 10(*b*) illustrates HTML data after the HTML data of FIG. 10(*a*) is translated through the process illustrated in the flowchart of FIG. 11.

In the HTML data after translation, text data 710b obtained by translating the text data 710a to English, reference data 720 of the image unchanged before and after translation, and text data 730b obtained by translating the text data 730a to English are contained. Further, a tag 740b specifying the reference URL is added. The text data 710b, the reference data 720 of the image, and the text data 730b correspond to the text 310b, the image 320, and the text 330b of the web page after translation (FIG. 8(*b*)), respectively. Further, a character size of the text data 710b is corrected into 90% of a normal size through the correction process (S840 in FIG. 11) in procedure 33. Other data settings are not particularly changed.

3-3. Translation Process in Variant 2

<(a) HTML Data Before Translation>

In FIG. 12(*a*), a part of HTML data before translation in variant 2 is illustrated. Reference data 920*a* of an image and Japanese text data 930*a*, in addition to Japanese text data 910*a*, are contained in the HTML data before translation. Further, styles are set in some tags by style sheets (CSS format). The text data 910*a* and the reference data 920*a* of the image correspond to the text 410*a* and the image 420 of the web page before translation (FIG. 9(*a*-1)), respectively. Further, the text data 930*a* corresponds to the un-visualized text data 430*a* in the web page before translation (FIG. 9(*a*-2)).

The image referenced by the reference data 920*a* of the image is set to be displayed with a width of 840 pixels and a height of 120 pixels in a position of 0 pixels from the top of a predetermined area (having a width of 840 pixels and a height of 120 pixel) and 0 pixels from the left, with an upper left vertex being aligned. Meanwhile, text corresponding to the text data 930*a* is set to be displayed as usual in a position of 30 pixels from the top of a predetermined area (having a width of 840 pixels and a height of 120 pixel) (here, to be centered). However, since text corresponding to the text data 930*a* is un-visualized (a value of a character color attribute is set to transparent), the text is invisible within the window of the web browser.

<(b) Translation Process>

Figure 13:
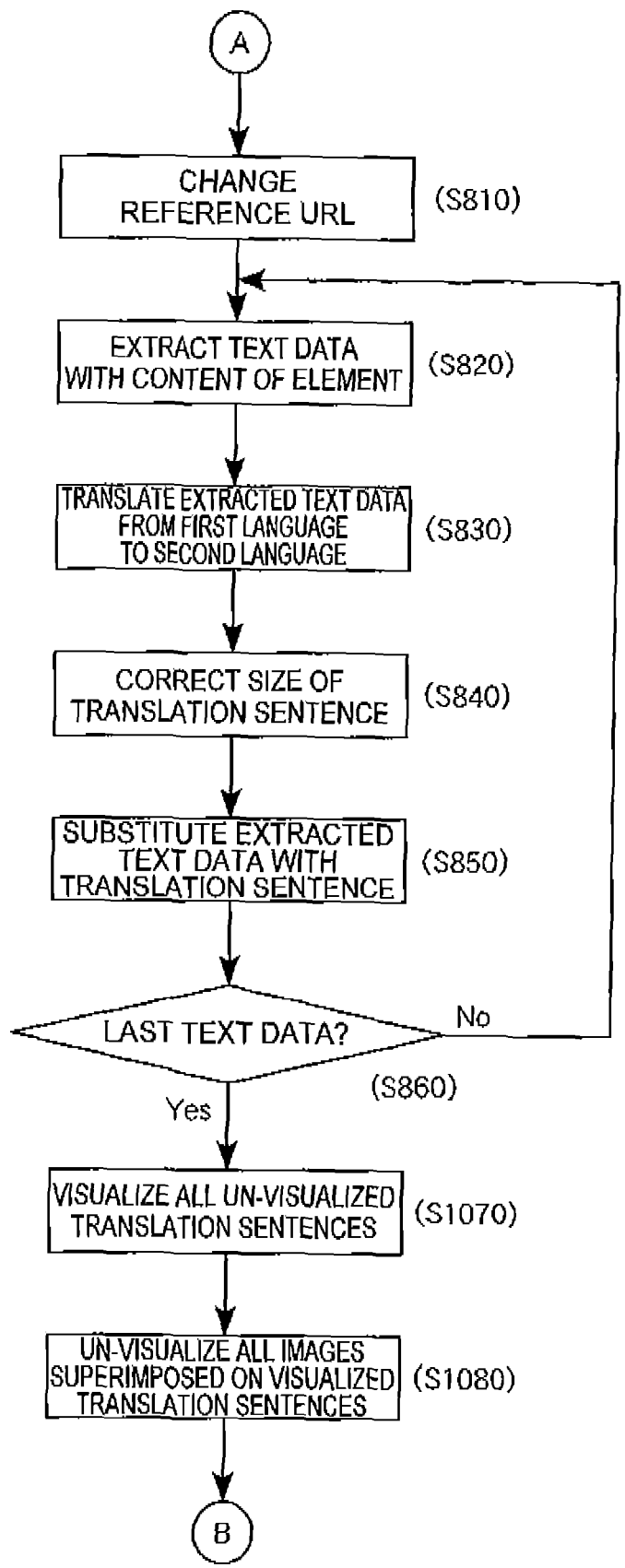
FIG. 13 is a flowchart illustrating a flow of a translation process (variant 2)

A flow of a translation process in variant 2 will be described with reference to a flowchart of FIG. 13. As illustrated in FIG. 13, the translation server 12 translates the HTML data according to the following procedure 36, as well as procedures 31 to 34 (as in the embodiment and variant 1). Further, in the flowchart of FIG. 13, a process with the same reference numeral as the process illustrated in the flowchart of FIG. 7 is the same process as the process illustrated in the flowchart of FIG. 7.

(Procedure 36)

All un-visualized translation sentences are visualized (S1070) and all images superimposed on the visualized translation sentences are un-visualized (S1080). For example, a class attribute of a tag "<div>" whose value of the class attribute is "class_11" in the example of FIG. 12(*a*) is deleted. Accordingly, text (explicitly un-visualized text) corresponding to text data 930*a* inherits an attribute of a parent element and is visualized (a character color attribute is changed from transparent to colored). Further, the value of the class attribute of a tag "<img>" whose value of the class attribute is "class_21" is changed into "class_22." Accordingly, an image (explicitly visualized image) corresponding to the reference data 920*a* of the image is explicitly un-visualized (the display attribute is changed from display to non-display). Further, the visualization of the translation sentence and/or the un-visualization of the image may be performed by applying the class attributes all at once as described above or may be individually performed for each tag.

<(c) HTML Data after Translation>

In FIG. 12(*b*), a part of HTML data after translation in variant 2 is illustrated. FIG. 12(*b*) illustrates HTML data after the HTML data of FIG. 12(*a*) is translated through a process illustrated in the flowchart of FIG. 13.

Text data 910*b* obtained by translating the text data 910*a* to English, reference data 920*b* obtained by un-visualizing the reference data 920*a*, and text data 930*b* obtained by translating the text data 930*a* to English and visualizing resultant text data are contained in the HTML data after translation. Further, a tag 940*b* specifying a reference URL is added. The text data 910*b* and the text data 930*b* correspond to the text 410*b* and the text 430*b* of the web page after translation (FIG. 9(*b*)), respectively. Further, a character size of the text data 910*b* is corrected to 90% of a normal size through the correction process (S840 in FIG. 13) of procedure 33 described above. Other data settings are unchanged except for particularly specified settings.

3-4. Variant of System Configuration

<(a) Configuration in which Translation Server is Present in Remote Location>

Figure 14:
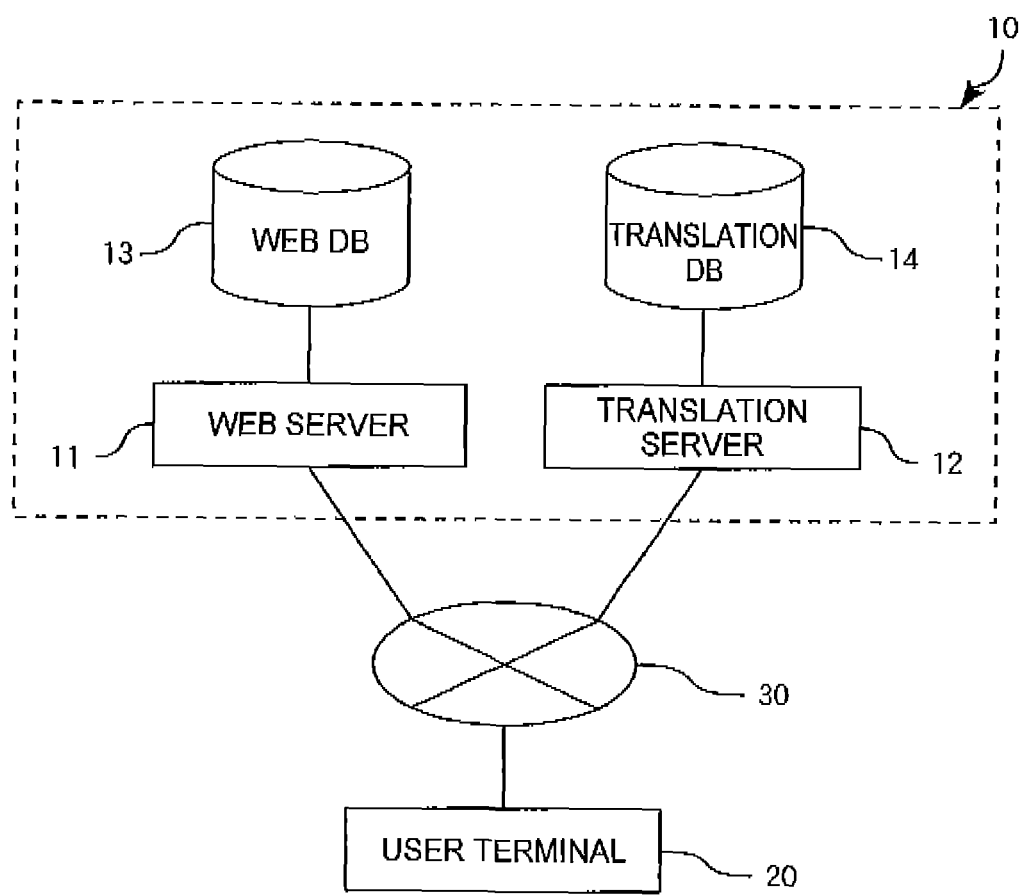
FIG. 14 is a diagram illustrating a variant of a system configuration (another embodiment)

In the embodiment and the variant described above, the web server 11 and the translation server 12 are connected via the private network such as a LAN (FIG. 2). This is a configuration in which it is assumed that the two servers are under management of the same business. On the other hand, as illustrated in FIG. 14, the web server 11 and the translation server 12 may be connected via a public network such as the Internet 30. This is a configuration in which it is assumed that the web server 11 or the translation server 12 is present in a remote location (e.g., in another office, in a data center in the remote location, or under management of another business).

<(b) Configuration in which Web Server has Translation Processing Function>

Figure 15:
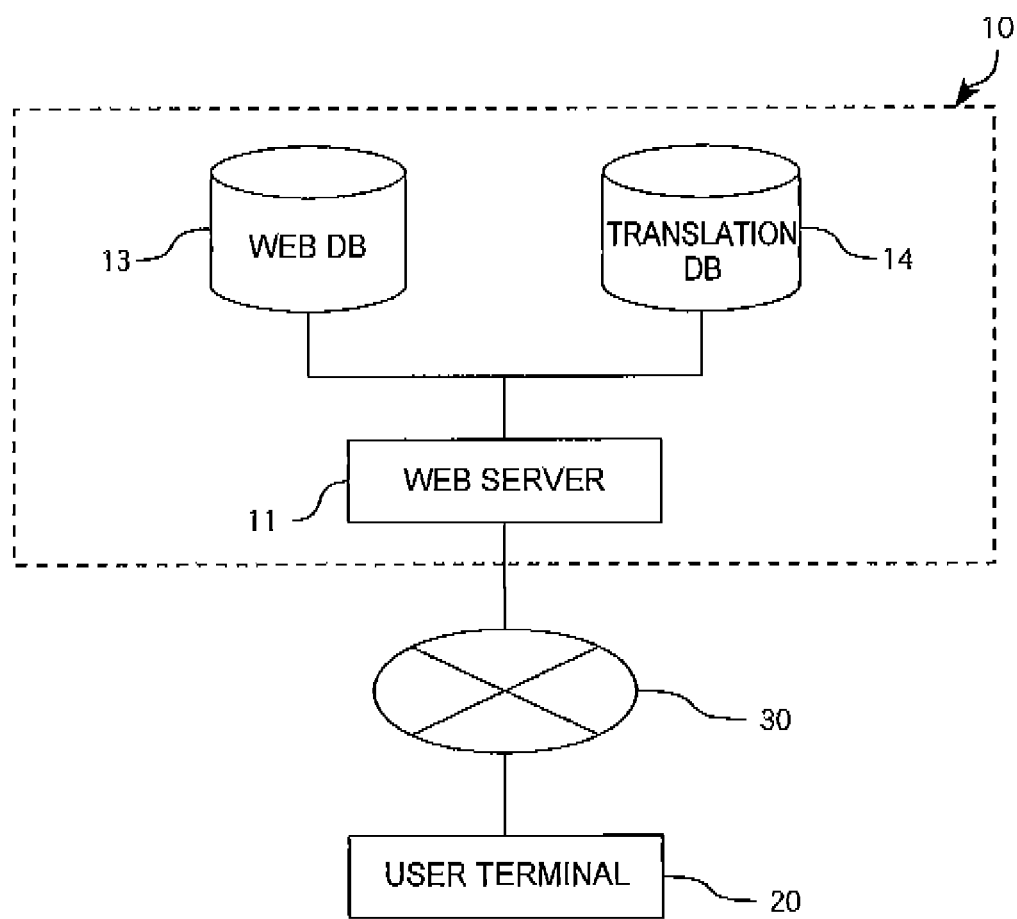
FIG. 15 is a diagram illustrating a variant of a system configuration (another embodiment)

In the embodiment and the variant described above, the machine translation system 10 includes the web server 11 and the translation server 12 (FIG. 2). This is a configuration in which each type of hardware is specialized in a specific processing function for load distribution. On the other hand, all steps in the machine translation process may be executed by the web server 11. In this case, as illustrated in FIG. 15, the web server 11 includes a web DB 13 and a translation DB 14. Further, a subject of a process of receiving a translation request from a user terminal 20, acquiring HTML data that is a translation target, executing a translation process, and transmitting HTML data after translation and necessary image data is the web server 11.

3-5. Variant of Process Distribution

In the embodiment and the variant described above, the web server 11 is specialized in a process of transmitting HTML data or image data. Similarly, the translation server 12 is specialized in a process of receiving a translation request from the user terminal 20 to create HTML data after translation, and transmitting the HTML data to the user terminal 20 (FIG. 4). On the other hand, the web server 11 may perform the process of receiving a translation request from the user terminal 20 and the process of transmitting the HTML data after translation to the user terminal 20, and the translation server 12 may be specialized only in the web page translation process (S810 to S860 in FIGS. 7, 11 and 13).

3-6. Machine Translation Program

While the machine translation system or the machine translation method has been described in the embodiment and the variants described above, the present invention may be provided as a machine translation program for causing each means included in the machine translation system to be realized as a function in one or a plurality of computers. This machine translation program includes, for example, a module corresponding to each means, in addition to a main module.

Further, the machine translation program is provided by a recording medium or a semiconductor memory, such as a ROM. Further, the machine translation program may be provided as a data signal via a network.

3-7. Variant of Style Setting

<(a) Variant of Visualization of Un-Visualized Text>

In a process of visualizing un-visualized text, for example, the following scheme may be adopted in consideration of the consistency with other setting items.

Change a visibility attribute (a display attribute) of an element <div> from "hidden" to "visible" (default).

Delete comment tags having text data or all elements with the text data as content interposed therebetween.

<(b) Variant of Visualization of Un-Visualized Image>

In a process of visualizing an un-visualized image, for example, the following scheme may be adopted in consideration of the consistency with other setting items.

Change a visibility attribute (a display attribute) of an element <div> from "visible" (default) to "hidden."

Delete comment tags having image data or all elements with the image data as content interposed therebeteween.

Change a display attribute (a display format) of the element <div> or a tag <img> from "none" to "block."

<(c) Variant of Un-Visualization of Visualized Image>

In the process of un-visualizing a visualized image, for example, the following scheme may be adopted in consideration of the consistency with other setting items.

Interpose the entire element <div> or the tag <img> between comment tags (comment out).

Delete the entire element <div> or the tag <img>.

Change a visibility attribute (a display attribute) of the element <div> from "visible" (default) to "hidden."

Change a display attribute (a display format) of the element <div> or the tag <img> into "none."

<(d) Concept of Un-Visualization>

In the embodiment and variant 2 described above, the terminology "un-visualization" is used as a concept including a process for allowing an object to be "entirely invisible." On the other hand, the same effect as "un-visualization" may be obtained through a process for allowing an object to be "almost invisible" to a user, such as a process of setting to semitransparent, increasing transparency, graying out, or setting to a very thin color (values of RGB are all set as about 200 or more). Accordingly, such a process is substantially equivalent to "un-visualization."

3-8. Variant of Style Setting

In variant 1 described above, the styles are individually set in the HTML tags (FIG. 10). Further, in the embodiment and variant 2 described above, a style defined within an HTML source may be applied to all tags with a specific class name (FIGS. 6 and 12). On the other hand, a style may be applied by referencing an external file described in predetermined style sheet language (e.g., CSS (Cascading Style Sheets)). Further, all styles may be set by attributes of the HTML tags.

4. Description Example of Source Code and Display Example of Web Page

Figure 19:
FIG. 19 illustrates an example of an un-visualized background image (another embodiment)
Figure 20:
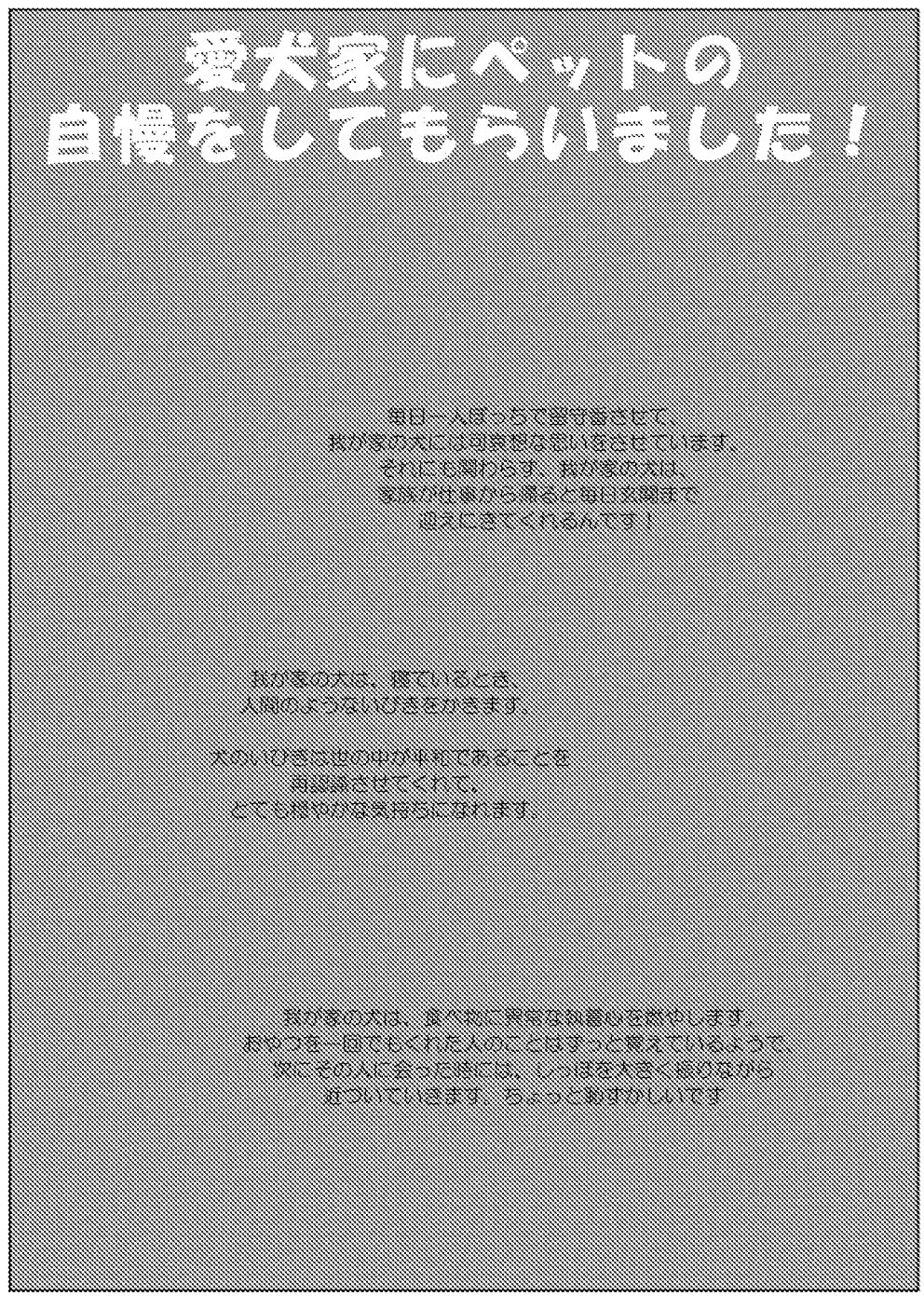
FIG. 20 illustrates an example of un-visualized Japanese text (another embodiment)

Hereinafter, a case in which a Japanese web page is translated to another language (English, Chinese or Korean) will be described by way of example. In FIG. 16, an example of an HTML source before machine translation is shown. In the HTML source illustrated in FIG. 16, a source of a style sheet (file name "test.css") illustrated in FIG. 17 is associated. Display positions of text in the HTML data are set as illustrated in FIG. 20 according to a background image (file name "test.gif") illustrated in FIG. 19. Further, in FIG. 20, the background is shown in gray so that white characters in an uppermost part are clear.

Figure 18:
FIG. 18 illustrates a display example of a Japanese web page (another embodiment)

In FIG. 18, a web page display example in which the HTML source illustrated in FIG. 16 is read using a web browser is illustrated. In a web page before translation, an image containing Japanese characters (file name "first.gif") is visualized, and a background image illustrated in FIG. 19 and text illustrated in FIG. 20 are un-visualized. Thus, as the web page is separated into the image, the background image, and the character part for a 3-layered configuration (a layer of the image, a layer of the background image, and a layer of the text), the web page before translation can be displayed by only an image containing characters, resulting in a beautiful appearance and high display speed.

Figure 21:
FIG. 21 illustrates a display example of an English web page (another embodiment)
Figure 22:
FIG. 22 illustrates a display example of a Chinese web page (another embodiment)
Figure 23:
FIG. 23 illustrates a display example of a Korean web page (another embodiment).

In a translation process, a layer is switched from the layer of the image to the layer of the background image and the layer of the text and the web page is translated using the layer of the text. Accordingly, only the character part can be a machine translation target. Display examples after translation are illustrated in FIGS. 21 to 23. FIG. 21 illustrates a display example after translation to English, FIG. 22 illustrates a display example after translation to Chinese, and FIG. 23 illustrates a display example after translation to Korean. The display examples illustrated in FIGS. 21 to 23 have sufficient expressivity as compared to an image integrated with characters (FIG. 18), and a visual appearance is maintained before and after translation.

REFERENCE SIGNS LIST

10 . . . machine translation system, 11 . . . web server, 12 . . . translation server, 13 . . . web DB, 14 . . . translation DB, 20 . . . user terminal, 30 . . . Internet, 40 . . . router.

The invention claimed is:

1. A machine translation system that translates a web page that is a translation target represented in a predetermined language, to another language and provides the translated web page, wherein the machine translation system is capable of being connected to:

web data storage unit configured to store HTML data in which a structure of the web page that is the translation target is described and the image data referenced by the HTML data; and translation data storage unit configured to store dictionary data used for a text translation process, wherein the HTML data contains a set of a description about a visualized image containing characters, a description about a background image whose display position is set to a predetermined position corresponding to a display position of the image and which is un-visualized and contains no characters, and a description about un-visualized text in the predetermined language whose display position is set to a front of a predetermined position superimposed on the background image, and wherein the machine translation system comprises:

translation request reception unit configured to receive a translation request from a terminal of a user viewing the web page, the translation request containing a URL corresponding to the web page that is the translation target and designation data designating a language after translation;

HTML data acquisition unit configured to acquire the HTML data in which a structure of the web page corresponding to the URL contained in the translation request is described, from the web data storage unit;

translation unit configured to translate text contained in the HTML data acquired by the HTML data acquisition unit to the language after translation corresponding to the designation data contained in the translation request with reference to the dictionary data stored in the translation data storage unit;

visualized element switching unit configured to visualize the un-visualized text and the background image contained in the HTML data acquired by the HTML data acquisition unit and un-visualize the visualized image contained in the HTML data;

translated HTML data transmission unit configured to reconstruct the HTML data acquired by the HTML data acquisition unit using the text translated by the translation unit and transmit the reconstructed HTML data to the terminal; and image data transmission unit configured to read the designated image data from the web data storage unit and transmit the image data to the terminal in response to a transmission request designating the image data from the terminal.

2. The machine translation system according to claim 1, wherein the visualized element switching unit visualizes un-visualized text by changing a character color attribute of text from transparent to colored, changing a display attribute of an area containing text from non-display to display, or deleting comment tags having tags of the area containing the text interposed therebetween.

3. The machine translation system according to claim 1, wherein the visualized element switching unit visualizes the un-visualized background image by changing a display attribute of the background image from non-display to display, changing a display attribute of an area containing the background image from non-display to display, or deleting comment tags having tags corresponding to the background image interposed therebetween.

4. The machine translation system according to claim 1, wherein the visualized element switching unit un-visualizes the visualized image by changing a display attribute of the image from display to non-display, deleting tags corresponding to the image, interposing tags corresponding to the image between comment tags, changing a display attribute of an area containing the image from display to non-display, or interposing tags corresponding to the area containing the image between comment tags.

5. The machine translation system according to claim 1, wherein the translated HTML data transmission unit changes a reference URL of the HTML data acquired by the HTML data acquisition unit into the URL of the web page, which is the translation target, contained in the translation request.

6. The machine translation system according to claim 1, wherein the translated HTML data transmission unit corrects a length of the text translated by the translation unit to be small when the length of the text translated by the translation unit is greater than a length of predetermined text contained in the HTML data acquired by the HTML data acquisition unit by a certain value or more.

7. A computer-readable recording medium having a machine translation program recorded thereon for causing each unit included in the machine translation system according to claim 1 to be realized as a function in one or a plurality of computers.

8. A machine translation method in a machine translation system that translates text of a web page that is a translation target represented in a predetermined language, to another language and provides the translated web page, wherein the machine translation system is capable of being connected to:

web data storage unit configured to store HTML data in which a structure of the web page that is the translation target is described and the image data referenced by the HTML data; and translation data storage unit configured to store dictionary data used for a text translation process, wherein the HTML data contains a set of a description about a visualized image containing characters, a description about a background image whose display position is set to a predetermined position corresponding to a display position of the image and which is un-visualized and contains no characters, and a description about un-visualized text in the predetermined language whose display position is set to a front of a predetermined position superimposed on the background image, and wherein the machine translation system executes:

a translation request reception step of receiving a translation request from a terminal of a user viewing the web page, the translation request containing a URL corresponding to the web page that is the translation target and designation data designating a language after translation;

an HTML data acquisition step of acquiring the HTML data in which a structure of the web page corresponding to the URL contained in the translation request is described, from the web data storage unit;

a translation step of translating text contained in the HTML data acquired in the HTML data acquisition step to the language after translation corresponding to the designation data contained in the translation request with reference to the dictionary data stored in the translation data storage unit;

a visualized element switching step of visualizing the un-visualized text and the background image contained in the HTML data acquired in the HTML data acquisition step and un-visualizing the visualized image contained in the HTML data;

a translated HTML data transmission step of reconstructing the HTML data acquired in the HTML data acquisition step using the text translated in the translation step and transmitting the reconstructed HTML data to the terminal; and an image data transmission step of reading the designated image data from the web data storage unit and transmitting the image data to the terminal in response to a transmission request designating the image data from the terminal.

* * * * *